M. HOLDREDGE.
Cultivator.
No. 222,783.  Patented Dec. 23, 1879.
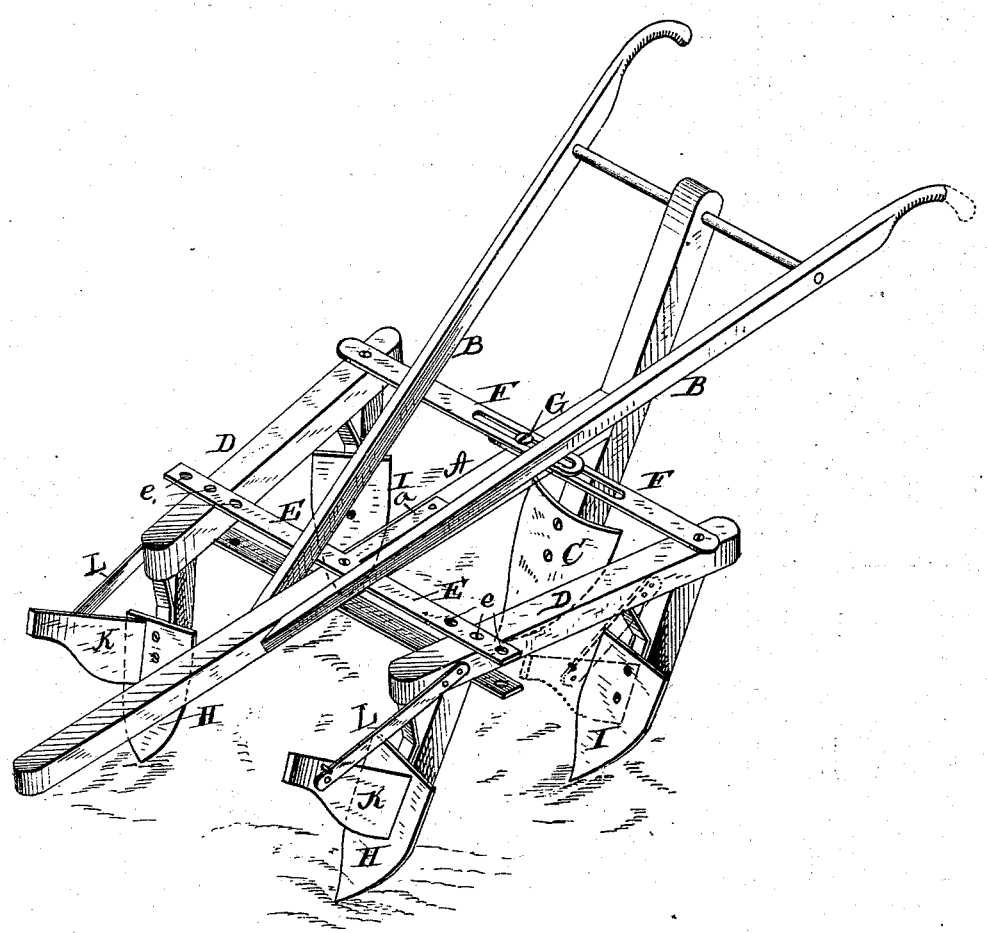
WITNESSES
INVENTOR
M. Holdredge
By H. P. Ennis,
ATTORNEY

UNITED STATES PATENT OFFICE.

MARTIN HOLDREDGE, OF KENT, OHIO.

IMPROVEMENT IN CULTIVATORS.

Specification forming part of Letters Patent No. 222,783, dated December 23, 1879; application filed August 5, 1879.

*To all whom it may concern:*

Be it known that I, MARTIN HOLDREDGE, of Kent, in the county of Portage and State of Ohio, have invented certain new and useful Improvements in Cultivators; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention relates to certain improvements in cultivators of that class employed to plow between rows of growing corn or other grain or plants; and it has for its object to adapt the cultivator to plow between rows of various widths, and also to prevent the soil upturned in making the furrow from being thrown upon the growing grain or plants.

To this end the invention consists of a central beam having a standard and plow and laterally-adjustable side beams, each carrying two plowshares, said side beams being pivoted back of their front ends, and so made adjustable that when the rear plows are moved outward the front plows will move inward, and vice versa, as more fully hereinafter specified.

The drawing represents a perspective view of my improved cultivator, in which—

The letter A indicates a central plow-beam, to the forward end of which the draft-animals are hitched in any convenient manner. The said plow-beam is provided with the usual handles B and with a plowshare, C, at its rear.

The letter D indicates two beams, adjustably secured at each side of the beam A by the cross-bars E, having the adjusting-holes *e* at each end, the side beams being pivoted near their forward ends to said cross-bars, and connected near their rear ends with the beam A by means of the slotted links F and adjusting-screw G.

The beams D are each provided with two or more shares, H I, and said beams may be set at such an angle to the beam A, and the plowshares so arranged with respect to each other and to the share C, that the respective shares will follow each other when the plow is drawn forward in such manner as to form a single broad furrow, the width of which may be varied by adjusting the side beams laterally by means of the slotted links and adjusting-screw before mentioned.

The letter K indicates two guides or shields secured to the arms L, attached to the side beams and projecting forwardly and laterally, so as to support the guards or shields at the outer edge and just in front of each plowshare. Said guards or shields prevent the soil as it is upturned from the furrow from falling upon the growing grain or plants and injuring the same.

Having described my invention, what I claim, and desire to secure by Letters Patent, is—

In a cultivator, the combination, with the center beam having a standard and plow, of two side beams, pivoted back of their front ends to a cross-bar, and each carrying two shovels and made adjustable, so that when the rear plows are moved outward the front plows will move inward, and vice versa, substantially as shown and described.

In testimony that I claim the foregoing I have hereunto set my hand this 25th day of June, 1879.

M. HOLDREDGE.

Witnesses:
W. J. VANCE,
O. S. ROCKWELL.